(No Model.)

G. W. REARDON.
COTTON CHOPPER.

No. 417,944. Patented Dec. 24, 1889.

WITNESSES
T. W. Fowler
W. H. Patterson

INVENTOR
George W. Reardon
by A. H. Evans & Co
Attorney

UNITED STATES PATENT OFFICE.

GEORGE W. REARDON, OF SUMTER, SOUTH CAROLINA.

COTTON-CHOPPER.

SPECIFICATION forming part of Letters Patent No. 417,944, dated December 24, 1889.

Application filed September 12, 1889. Serial No. 323,728. (No model.)

*To all whom it may concern:*

Be it known that I, GEORGE W. REARDON, a citizen of the United States, residing at Sumter, in the county of Sumter and State of South Carolina, have invented certain new and useful Improvements in Cotton-Choppers, of which the following is a full and clear description, reference being had to the accompanying drawings, forming part of this specification, in which—

Figure 1:
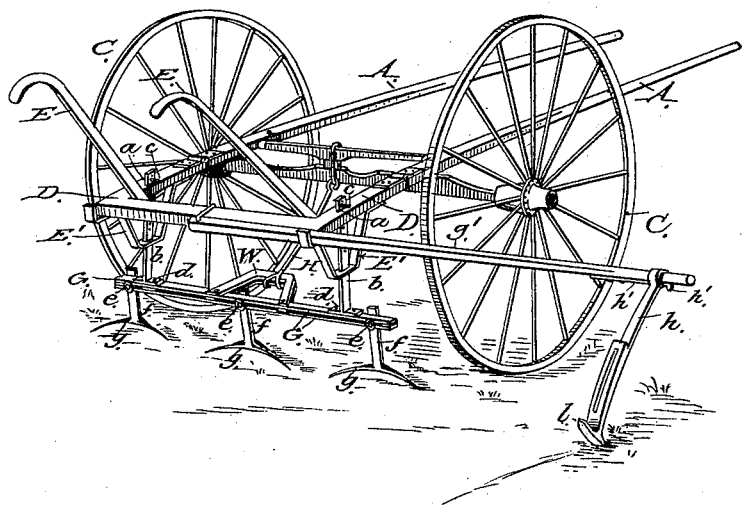
Figure 2:
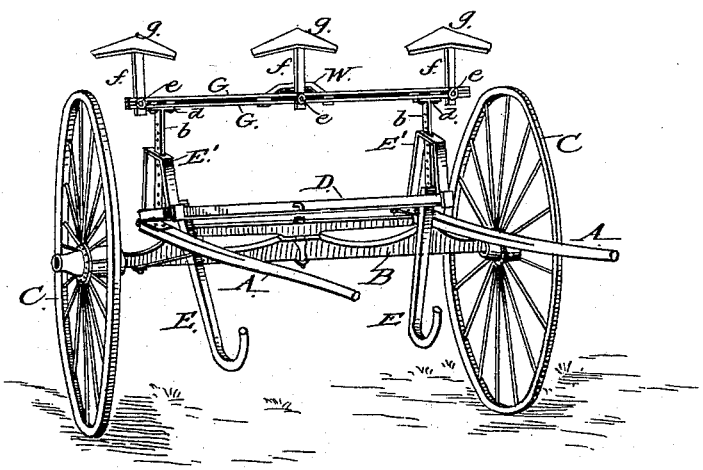

Figure 1 represents a perspective view of a cotton-chopper embodying my invention. Fig. 2 is a similar view showing the hinged supplemental frame turned up and the shovels or cutters elevated.

My invention relates to certain new and useful improvements in wheeled cotton-choppers; and it consists in the constructions and combinations of devices which I shall hereinafter fully describe and claim.

To enable others skilled in the art to make and use my invention, I will now describe its construction and indicate the manner in which I carry the same out.

Referring to the drawings, A represents the shafts or thills; B, the axle which connects their rear ends, and C are the wheels mounted upon the ends of the axle and supporting the machine in the usual manner. Just in the rear of the axle the projecting ends of the thills or shafts have hinged to them a three-sided frame D, which forms practically a continuation of the thills or shafts, and this frame has bolted or otherwise secured to it the handles E. The frame D is perforated at $a$ to receive the upper ends of vertical bars $b$, which have holes in which pins $c$ are adapted to be passed, whereby said bars are vertically adjusted, and to the under side of the frame D are securely fastened \/-shaped braces E', through the bottom plate of which the bars $b$ are adapted to be passed, whereby they are firmly braced and guided in their movements. The lower ends of the bars $b$ are flanged or have shoes $d$, which are bolted to two parallel and spaced bars G, that extend transversely of the machine and at a suitable distance above the ground, and in the space between these parallel bars G the bolts $e$, which secure the shanks $f$ of the shovels or cutters $g$, are adapted to be secured. The shovels or cutters are slightly concaved, and have their standards or shanks formed integrally with them, and they operate on the surface of the ground in the manner usual with this class of machines.

From this description it will be seen that by loosening the bolts $e$ the shanks of the shovels or cutters may be slipped along the spaced bars to any desired points, and then be secured in their new positions by again tightening up the bolts. The number of shovels or cutters with which the machine may be supplied may therefore be varied at pleasure, and the positions of the same with relation to each other may be varied as often as desired.

At points near the center of the transverse bars G are secured the rear ends of a ⌒-shaped bar W, whose contracted closed end projects forwardly and is engaged by the rear end of a stay-rod H, that extends upwardly therefrom to the axle, to which it is also secured in any well-known manner, whereby the hinged frame D is held down in its proper position when the machine is at work. The machine is also provided with a pivoted marking-arm $g'$, to the outer end of which is loosely hung the marking-shoe $h$, which is fitted to said arm $g'$ by means of a sliding rod or key $h'$, which not only secures the marking-shoe, but also permits it to have an adjustment on said rod. The lower end of the marking-shoe is formed with a spur $l$ projecting from its front and rear sides, whereby when the marker is in position one of these spurs will mark the ground in the usual manner. The frame D, before mentioned, being jointed to the shafts or thills, may be turned on its hinge and caused to assume the position shown in Fig. 2, in which case the shovels or cutters are held above the machine and the frame D supported upon the rear extended portions of the thills. The machine may now be drawn on and off the field without bringing the hoes or cutters in contact with the ground.

Having thus described my invention, what I claim as new, and desire to secure by Letters Patent, is—

1. In a cotton-chopper, the shafts or thills, the main axle, and the wheels thereon, in combination with the frame D, extending in line with the thills and having its side bars hinged to the rear ends of said shafts or thills, transverse spaced bars adjustably suspended from said hinged frame, and shovels or cutters having their shanks or standards adjustably fitted to said bars, substantially as described.

2. In a cotton-chopper, the combination of a wheeled frame, a three-sided frame hinged to the rear thereof, the transverse spaced bars having shovels or cutters adjustably fitted thereto, the vertical bars bolted to the transverse bars and having their upper ends passed through openings in the hinged frame and held by pins, whereby the bars are vertically adjusted, and $\vee$-shaped braces bolted to the hinged frame and guiding the movements of the vertical bars, substantially as described.

3. In a cotton-chopper, a wheeled frame, a supplemental frame hinged in the rear thereof, and transverse bars carrying shovels or cutters and adjustably suspended from said hinged frame, in combination with a projection from the front of the transverse bars and a stay-rod between this projection and the main axle, substantially as described.

GEORGE W. REARDON.

Witnesses:
D. J. AULD,
JNO. S. RICHARDSON, Jr.